(12) United States Patent
Renaud et al.

(10) Patent No.: US 8,071,162 B2
(45) Date of Patent: Dec. 6, 2011

(54) METHOD OF COATING A SURFACE WITH NANOPARTICLES

(75) Inventors: Philippe Renaud, Tournefeuille (FR);
Celine Desvaux, Toulouse (FR);
Catherine Amiens, Toulouse (KR);
Bruno Chaudret, Vigoulet Auzil (FR)

(73) Assignee: Freescale Semiconductor, Inc., Austin, TX (US)

( * ) Notice: Subject to any disclaimer, the term of this patent is extended or adjusted under 35 U.S.C. 154(b) by 877 days.

(21) Appl. No.: 11/815,190

(22) PCT Filed: Jan. 31, 2005

(86) PCT No.: PCT/IB2005/000456
§ 371 (c)(1), (2), (4) Date: May 12, 2008

(87) PCT Pub. No.: WO2006/079871
PCT Pub. Date: Aug. 3, 2006

(65) Prior Publication Data
US 2008/0280143 A1    Nov. 13, 2008

(51) Int. Cl.
*B05D 3/02* (2006.01)
(52) U.S. Cl. ......................... 427/229; 427/226
(58) Field of Classification Search .................. 427/226, 427/229
See application file for complete search history.

(56) References Cited

U.S. PATENT DOCUMENTS

| | | | |
|---|---|---|---|
| 6,045,925 A | 4/2000 | Klabunde et al. | |
| 6,162,532 A | 12/2000 | Black et al. | |
| 2002/0011564 A1 | 1/2002 | Norris | |
| 2003/0003300 A1 | 1/2003 | Korgel et al. | |
| 2003/0097976 A1 | 5/2003 | Zehnder et al. | |
| 2003/0121364 A1 | 7/2003 | Sun | |
| 2003/0157325 A1 | 8/2003 | Anders et al. | |
| 2004/0253386 A1 * | 12/2004 | Deevi et al. | 427/421.1 |

OTHER PUBLICATIONS

Adv. Func. Materials, Oct. 2002, vol. 12, No. 10, pp. 653-664.*
Rogach et al; "Organization of Matter on Different Size Scales: Monodisperse Nanocrystals and their Superstructres"; Adv. Func. Mater. 2002, 12, No. 10, October.
Gromov et al; "Electromagnetic analysis of layered magnetic/conductor structures"; J. Phys. D: Appl. Phys. 33 (2000) 773-779, printed in the UK.
G. A. Held, et al, "Magnetics of Ultrathin FePt Nanoparticle Films", Journal of Applied Physics, vol. 95, No. 3, pp. 1481-1484, Feb. 1, 2004.
Brian G. Prevo, et al, "Controlled, Rapid Deposition of Structured Coatings from Micro-Nanoparticle Suspensions", Dept. of Chemical Engineering, North Carolina State University, Langmuir 2004, pp. 2099-2107.
Jocelyn F. Hicks, et al, "Layer-by-Layer Growth of Polymer/Nanoparticle Films Containing Monolayer-Protected Gold Clusters", Kenan Laboratories of Chemistry, University of North Carolina, Langmuir 2002, pp. 2288-2294.
Gero Decher, et al, "Fuzzy Nanoassemblies: Toward Layered Polymeric Multicomposites", Science, vol. 277, Aug. 29, 1997, pp. 1232-1237.

* cited by examiner

*Primary Examiner* — Frederick Parker

(57) ABSTRACT

Known techniques for forming nanoparticles require a multiple-step process to coat a surface with nanoparticles. The present invention provides a single-step process that requires the deposition of a substrate in a mixture of a solvent, ligands and organometallic precursors. The mixture containing the substrate is heated under pressure in a dihydrogen environment for a predetermined period of time, during which supercrystals of nanoparticles form on the substrate.

20 Claims, 3 Drawing Sheets

METHOD OF COATING A SURFACE WITH NANOPARTICLES

FIELD OF THE INVENTION

This invention relates to a method of coating a surface with nanoparticles of the type, for example, that overlies a substrate.

BACKGROUND OF THE INVENTION

Thin film technology, wherein inorganic particles with sizes on the order of 1-100 nm are arranged in layers to form a film, is currently being used for an increasingly large number of different technological applications, including: information storage systems, chemical and biological sensors, fibre-optic systems, and magneto-optic and optical device.

A number of techniques are currently known for the preparation of such films. U.S. Pat. No. 6,805,904 discloses a method and structure that forms a multilayer nanoparticle thin film assembly by functionalizing a substrate with functional molecules and then replacing a stabilizer on a bottom surface of first nanoparticles with the functional molecules via surface ligand exchange to make a first nanoparticle. U.S. Pat. No. 6,676,729 relates to a method of making nanoparticles via metal salt reduction by firstly mixing metal salts in a solvent and then adding a reducing agent to the solvent. The nanoparticle dispersion is then stabilized and the nanoparticles precipitated from the nanoparticle dispersion. Finally, the nanoparticles are re-dispersed into the solvent. "Alternation of cationic and anionic polymeric materials and metal nanoparticles" (Decher et al., Science 1997, vol. 277: page 1232) describes alternation of cationic and anionic polymeric materials and metal nanoparticles. This is also described in "Layer-by-Layer Growth of Polymeric Nanoparticle Films Containing Monolayer Protected Gold Clusters" (Jocelyn F. Hicks, Young Seok-Shon, and Royce W. Murray, Langmuir, 2002, 18, 2288-2294) and "Rapid deposition of gold nanoparticle films with controlled thickness and structure by convective assembly" (B. G. Prevo, J. C. Fuller, III and O. D. Velev, Chem. Mater, in press (2004)). U.S. Pat. No. 6,162,532 describes a layer-by-layer formation of a film of compact arrays of magnetic nanoparticles for a magnetic storage medium.

However, all of the above described techniques comprise multiple steps to achieve formation of the nanoparticles on the substrate employed, including formation of the nanoparticles, selection of the size of nanoparticles and then deposition of the nanoparticles. At each step, loss or degradation of the end-product is risked and, in particular, when the nanoparticles are air-sensitive, resulting in restricting possible applications of the nanoparticles formed due to the resulting degradation of the nanoparticles formed caused by an ambient atmosphere. Some solutions have been proposed to obviate this disadvantage, for example, coating the particles with an amorphous and inert substance, such as silica or a polymer, or forming an oxide coating on the nanoparticles as described in U.S. Pat. No. 6,045,925. However, such coating results in a loss of some of magnetic properties of the nanoparticle film.

STATEMENT OF INVENTION

According to the present invention, there is provided a method of forming nanoparticles as set forth in the claims herein.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Figure 1:
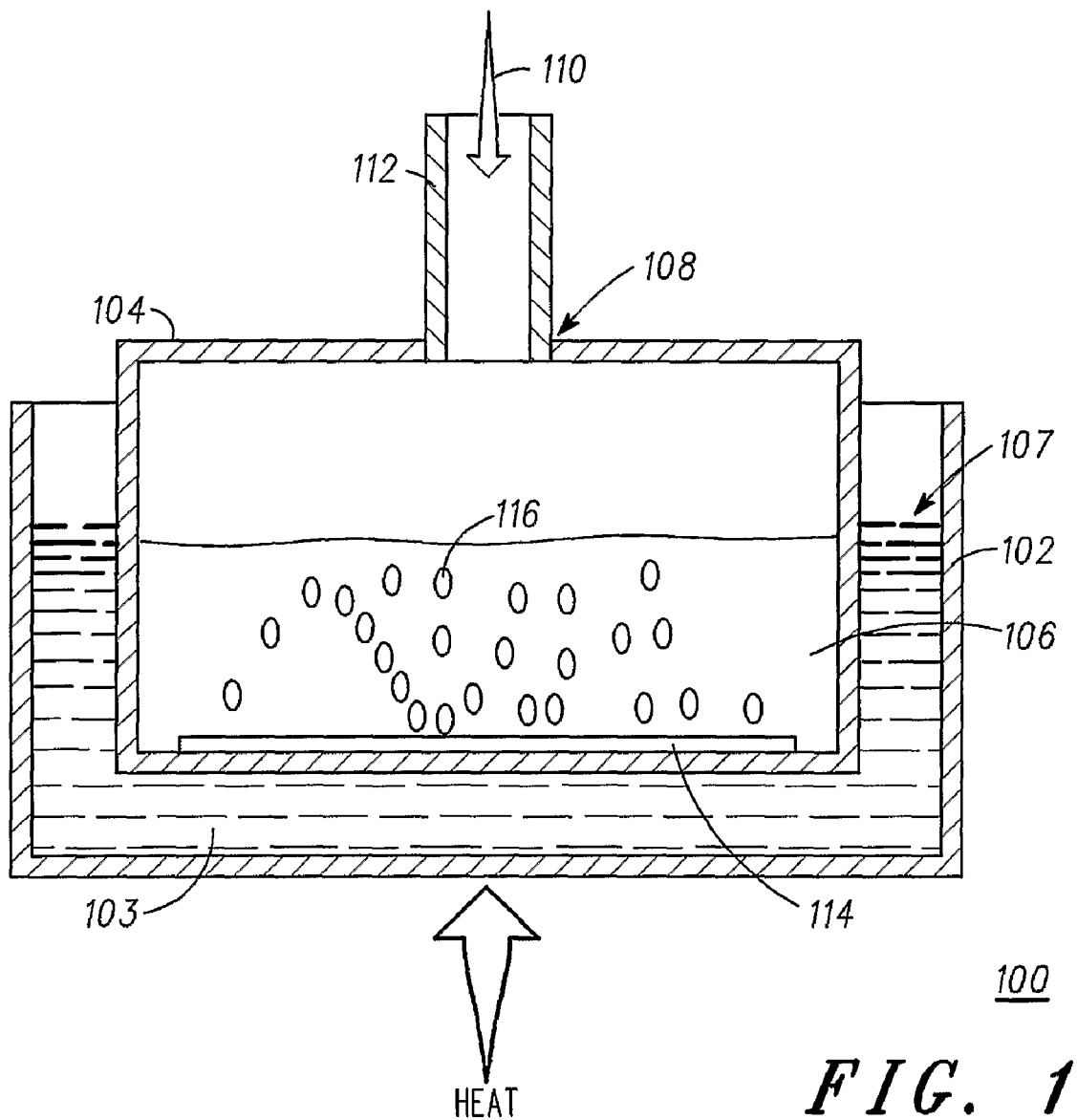
FIG. 1 is a schematic diagram of an apparatus for forming nanoparticles.

Referring to FIG. 1, an apparatus 100 for the manufacture of nanoparticles comprises a bath 102 of oil 103 in which a flask 104 is partially immersed. The oil 103 can be any suitable oil that has a boiling point that is higher than the temperature of the reaction to take place. The flask 104 contains a predetermined quantity of a mixture 106, the mixture being immersed below a level 107 of the oil 103 of the oil bath 102. In addition, an opening 108 of the flask 104 is connected to a source of gas 110, for example dihydrogen ($H_2$), via a tube 112 coupled to a pump (not shown) for pressuring the flask 104.

A seed material 114 is also disposed within the mixture 106 adjacent a base of the flask 104. The seed material 114 has at least one surface exposed to the mixture 106 and, in this example, is a silicon (Si) substrate. However, other materials can be used to form the seed substrate, for example glass, alumina, carbon, ceramics, or sapphire.

Figure 2:
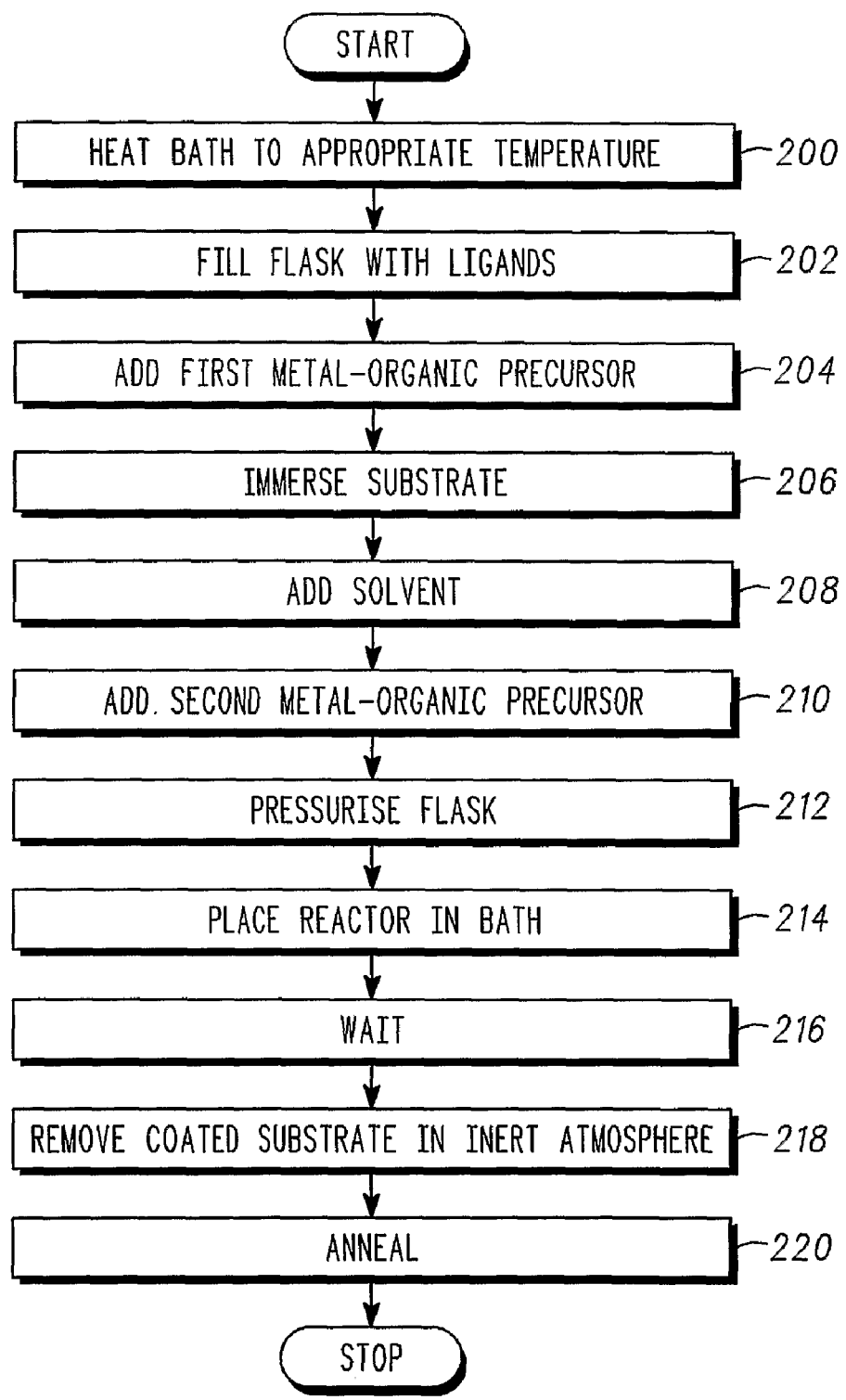
FIG. 2 is a flow diagram of a method of forming nanoparticles constituting an embodiment of the invention.

Turning to FIG. 2, the nanoparticles are formed as follows.

The bath 102 is firstly heated (Step 200) to an appropriate temperature for formation of nanoparticles 116 (FIG. 1) to take place, for example, between room temperature and 260° C. In this example, the bath is heated to a temperature of 150° C. The mixture 106 is then formed in the flask 104 by filling the flask 104 with ligands (Step 202), serving as a stabilising agents, for example an organic amine or acid, such as Oleylamine and/or hexadecylamine and/or carboxylic acid. In this example, the flask 104 is first filled with 1 mmol hexadecylamine and then 1 mmol of a carboxylic acid, such as oleic acid. Thereafter, a first metal-organic (organometallic) precursor, for example, a cobalt precursor, such as 1 mmol of cyclooctadiene-cyclooctenyl cobalt ($Co(\eta^3$—$C_8H_{13})$ ($\eta^4$—$C_8H_{12}$)), is then added (Step 204) to the flask 104.

The silicon substrate 114 is then immersed (Step 206) in the mixture created so far. 50 ml of a degassed and distilled solvent, for example, an ether or an aromatic solvent, such as mesytilene, toluene, or anisole is then added (Step 208) to the flask 104. In this example, the solvent is toluene, but the skilled person will appreciate that other solvents can be used. To complete the mixture 106, a second metal-organic (organometallic) precursor, for example, an iron precursor, such as 2 mmol of iron pentacarbonyl ($Fe(CO_5)$), is then added (Step 210) to the flask 104.

Although the above described example refers to specific precursor compounds, the skilled person will appreciate that, depending upon the type of nanoparticles that are being produced, different precursor compounds can be employed. Examples of iron precursors are: carbonyls; olefins, such as iron indenyl, iron cyclopentadienyl ($FeCp_2$), or iron fluorenyl; and amides, such as bis(bistrimethylsilyl)amide iron. Examples of cobalt precursors are: carbonyls, such as cobalt carbonyle $(CO_2(CO)_8)$; olefins, such as cobalt indenyl, cobalt cyclopentadienyl $(CoCp_2)$, or cobalt fluorenyl; and amides, such as bis(bistrimethylsilyl)amide cobalt.

The mixture 106 is subsequently pressurised (Step 212), for example, with 3 Bars of $H_2$. It should be appreciated that other pressures can be applied, for example between about 1 and about 5 Bars. Further, other reducing gasses can be employed, for example carbon monoxide. Thereafter, the mixture 106 is heated (Step 214), for example at 150° C. for 48 hours (Step 216).

Figure 3:
FIG. 3 is a scanning electron micrograph image of nanoparticles formed in accordance with the embodiment of FIG. 2.

During heating, the organometallic precursor therefore decomposes in the reductive atmosphere of dihydrogen to form nanoparticles 116. The substrate 114, located inside the flask 104, is in situ whilst the decomposition takes place, resulting in the nanoparticles 116 adhering to the silicon substrate 114 in an organised manner. Indeed, the nanoparticles 116, stabilised by the ligand, are self-organising in nature and crystallise on the substrate 114 as millimeter-scale super-crystals (sometimes known as superlattices) of bimetallic Fe/Co nanoparticles. The super-crystals are partially air-stable, having a slow oxidation rate. As can be seen from FIG. 3, the nanoparticles 116 display a compact arrangement and are adjacent the exposed surfaces of the silicon substrate 114. In this respect, layers of nanoparticles at least about 100 nm thick can be achieved. Moreover, the crystallisation of the nanoparticles results in a self-selection process that causes the size of the nanoparticles forming part of a given super-crystal to be homogeneous.

Once the above process has been completed, the dihydrogen is evacuated from the flask 104 and supernatant formed removed from the flask 104. The silicon substrate 114 is then removed (Step 218) from the flask 104 in an inert atmosphere to prevent contamination of the nanoparticles 116 that have formed on the surface of the substrate 114.

Figure 4:
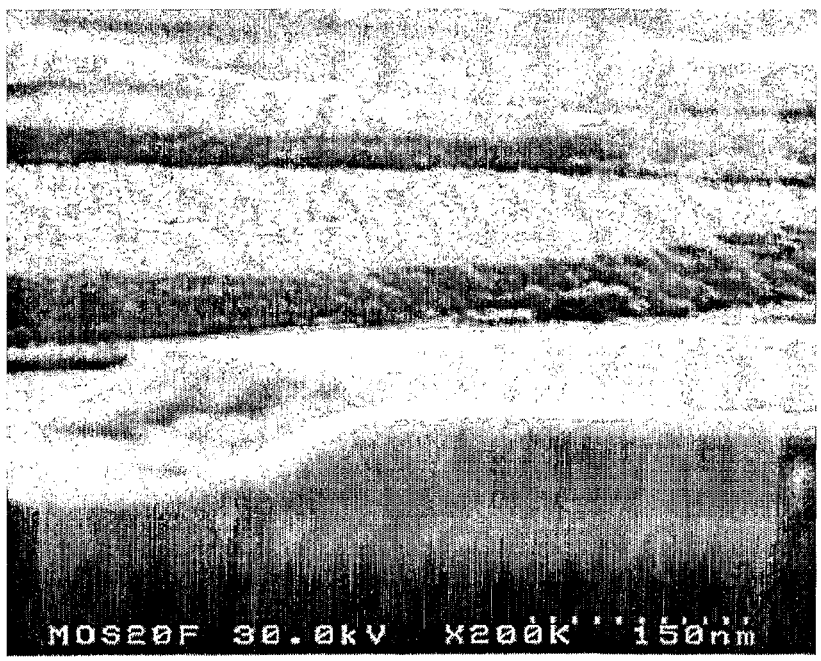
FIG. 4 is a scanning electron micrograph image of nanoparticles formed in accordance with another embodiment of the invention.

In another embodiment, a chemical binder, for example aminopropyltrimethoxysilane (APTMS), is deposited onto the substrate 114 to pattern the surface of the substrate 114 selectively, thereby controlling adhesion of the nanoparticles 116 to the substrate, as can be seen, for example, in FIG. 4.

In the embodiments described above, the layers of nanoparticles produced possess magnetic permeability values at high frequency, for example less than 1 GHz, that make the layers of nanoparticles produced particularly suitable for RF applications, such as to form RF inductors, transformers or other magnetic structures, such as magnetic shields. In particular, ferromagnetic nanoparticles films formed in accordance with the above described technique can be used to integrate RF inductors into circuits. Indeed, such nanoparticle materials can be used in high-frequency Integrated Circuit (IC) applications, such as for wireless portable electronic devices, to enhance magnetic field confinement in a variety of passive and active devices.

In a further embodiment of the invention, the above described layers and multiple layers of nanoparticles can be annealed (Step 220) during processing, resulting in the ligands becoming burnt, thereby coating substantially each nanoparticle with a continuous carbon film that is, for example, 1-2 nm thick so as to isolate the nanoparticles from the ambient atmosphere. The nanoparticles therefore become completely air-stable.

It is thus possible to provide a method of forming nanoparticles in a single process step in a way that is low-cost and does not required additional re-dispersion and deposition of the nanoparticles. Organised nanoparticles can therefore be formed directly on a substrate surface in a simpler manner than hitherto possible and without the need for separate filtering and dispensing of the nanoparticles. Additionally, by obviating the need for slow evaporation of a solvent, the speed of the process is increased. Consequently, the above method is particularly suitable for the formation of high permeability films, where lateral dimensions are about 100 times greater than vertical dimensions, for improving thin-film inductor/transformer/transmission-line performance. RF components formed from the above-described nanoparticle films are low-loss. The high permeability of the nanoparticles films results in improved component and circuit performance through reduced parasitics and a high quality (Q) factor, thus impacting upon many circuit performance specifications, for example amplifier gain and Voltage Controlled Oscillator (VCO) phase noise. Also, improved signal isolation is possible for circuits employing high permeability nanoparticle films, resulting in reduced power consumption, as well as a reduction in the scale of circuit designs that consequently can have a positive impact upon cost and/or form factor as well as yield of electronic circuits, for example analogue, mixed-signal and RF-(Bi)CMOS integrated circuit.

Although the above examples have been described in the context of forming bimetallic Co/Fe nanoparticles 116, it should be appreciated that the above technique can be adapted for use in relation to other applications, for example to the field of optoelectronics by fabricating Gallium Arsenide (GaAs), Gallium Phosphide (GaP), Indium Phosphide (InP), Cadmium Telluride (CdTe) or Germanium (Ge) nanoparticles, and/or in relation to passive components, for example capacitors, inductors or a voltage dependent resister. Additionally, the ability to arrange quantum dots on a substrate can be used to create high-efficiency Light Emitting Diodes (LEDs), lasers and/or very high resolution detectors having, for example, a pixel size in the nanometer range.

It should be appreciated that although the use a of substrate has been described herein, other seed materials of different physical forms and dimensions can be used, for example wires or metal lines. It should also be appreciated that whilst the formation of a particular type of ferromagnetic nanoparticles is being described herein, the above described technique is applicable to the formation of other types of ferromagnetic nanoparticles, for example Iron-Platinum (FePt), Iron-Nickel (FeNi), Iron-Cobalt-Nickel, or Cobalt-Platinum.

Whilst specific, and preferred, implementations of the present invention are described above, it is clear that one skilled in the art could readily apply variations and modifications of such inventive concepts.

The invention claimed is:

1. A method of coating a surface with nanoparticles, the method comprising the steps of:
providing a mixture of a first organometallic precursor and a second organometallic precursor, ligands and a solvent;
pressurising the mixture with a reducing gas; and
heating the mixture; characterised by:
patterning a seed surface with a binding compound for selective adhesion of the nanoparticles to the surface prior to disposal of the seed surface in the mixture; and
disposing the seed surface in the mixture.

2. A method as claimed in claim 1, wherein nanoparticles subsequently form on the seed surface.

3. A method as claimed in claim 1, wherein the seed surface is a surface of a substrate.

4. A method as claimed in claim 1, wherein the seed surface is defined by a wire or metal line.

5. A method as claimed in claim 2, further comprising the step of:
   annealing the nanoparticles subsequently formed on the seed surface.

6. A method is claimed in claim 1, wherein the nanoparticles are bimetallic.

7. A method is claimed in claim 1, wherein the reducing gas is dihydrogen or carbon monoxide.

8. A method as claimed in claim 2, wherein the seed surface is a surface of a substrate.

9. A method as claimed in claim 2, wherein the seed surface is defined by a wire or metal line.

10. A method as claimed in claim 3, further comprising the step of: annealing the nanoparticles subsequently formed on the seed surface.

11. A method as claimed in claim 2, wherein the nanoparticles are bimetallic.

12. A method as claimed in claim 2, wherein the reducing gas is dihydrogen or carbon monoxide.

13. The method as claimed in claim 1, wherein the binding compound is aminopropyltrimethoxysilane.

14. The method as claimed in claim 10, wherein annealing includes annealing to coat the nanoparticles with a continuous carbon film.

15. A method of coating a surface with nanoparticles, the method comprising the steps of:
   providing a mixture of a first organometallic precursor and a second organometallic precursor, ligands and a solvent;
   pressurising the mixture with a reducing gas, wherein the reducing gas is dihydrogen or carbon monoxide; and
   heating the mixture; characterised by:
      patterning a seed surface with a binding compound for selective adhesion of the nanoparticles to the surface prior to disposal of the seed surface in the mixture, wherein the seed surface is a surface of a substrate; and
      disposing the seed surface in the mixture;
      wherein nanoparticles subsequently form on the seed surface.

16. The method as claimed in claim 15, wherein the binding compound is aminopropyltrimethoxysilane.

17. A method of coating a surface with nanoparticles, the method comprising the steps of:
   providing a mixture of a first organometallic precursor and a second organometallic precursor, ligands and a solvent;
   pressurising the mixture with a reducing gas; and
   heating the mixture; characterised by:
      patterning a seed surface with a binding compound for selective adhesion of the nanoparticles to the surface prior to disposal of the seed surface in the mixture, wherein the seed surface is a surface of a substrate;
      disposing the seed surface in the mixture wherein nanoparticles subsequently form on the seed surface, wherein the nanoparticles are bimetallic; and
      annealing the nanoparticles subsequently formed on the seed surface.

18. The method as claimed in claim 17, wherein the reducing gas is dihydrogen or carbon monoxide.

19. The method as claimed in claim 17, wherein the binding compound is aminopropyltrimethoxysilane.

20. The method as claimed in claim 17, wherein annealing includes annealing to coat the nanoparticles with a continuous carbon film.

* * * * *